United States Patent Office 3,031,233
Patented Apr. 24, 1962

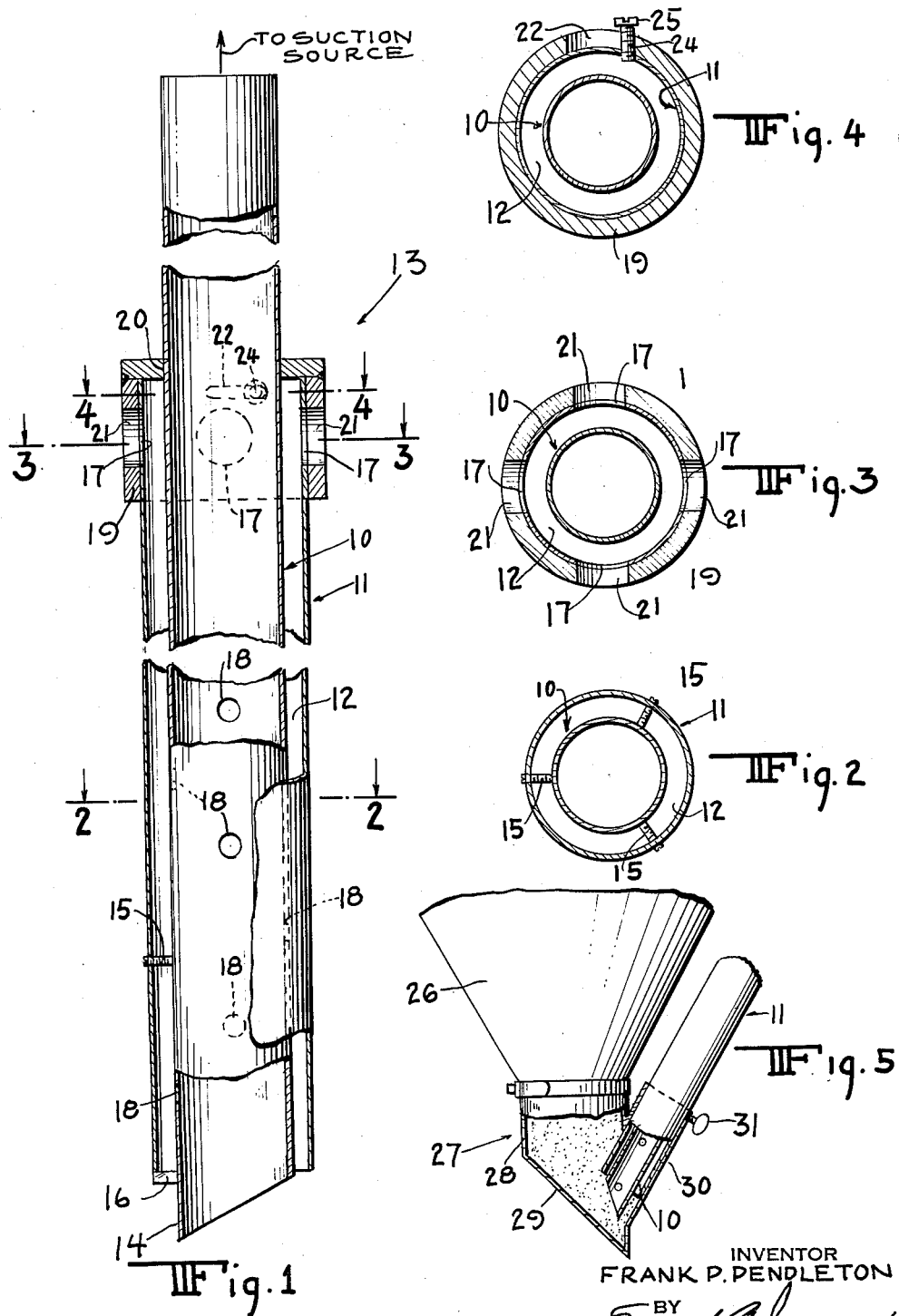

3,031,233
DEVICE FOR FLUIDIZING AND CONVEYING
FLUENT PARTICLES OF MATERIAL
Frank P. Pendleton, Montclair, N.J., assignor to Vac-U-Max, Belleville, N.J., a corporation of New Jersey
Filed May 11, 1960, Ser. No. 28,464
5 Claims. (Cl. 302—53)

The present invention relates to an improved device for conveying fluent particles of material due to a difference in pressure at the inlet and the outlet of conduit means, and, more particularly, to such a device provided with means to fluidize the material at the inlet end portion of the conduit means.

Apparatus has been proposed which is capable of conveying fluent particles of material by suction from a storage bin or receptacle and depositing the same into another receptacle. Heretofore, the material was removed from the storage receptacle simply by inserting the lower end portion of a tube into the material and connecting a suction hose to the upper end of the tube. However, it has been found, particularly in connection with certain types of materials, that at the end of a conveying operation when the suction is shut off and the tube is restored to atmospheric pressure, the material then in the hose and the tube is returned towards the lower end of the tube and is compacted therein to form a slug which seals the tube and prevents material to be drawn therethrough when suction is again applied. This necessitates that the tube be manually cleared of this slug. This is an annoying and time consuming operation which is particularly difficult where the tube is a part of a built in or fixed system.

Accordingly, an object of the present invention is to provide an improved device for conveying fluent particles of material which effects removal of the slug of material which may have been formed therein.

Another object is to provide such a device which fluidizes the material at the inlet end portion to render it more adaptable to be conveyed by suction.

A further object is to provide such a device which is simple and economical in construction and is reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a device which generally comprises an inner tube having an opening at its upper end adapted for connection to a source of vacuum, for example, and having an opening at its lower end, and spaced apart aperture means extending therethrough and an outer tube substantially coextensive with the inner tube and spaced therefrom to provide a passageway between the tubes terminating at the lower ends thereof and having opening means adjacent its upper end communicating with the passageway adapted for delivery of atmospheric air, for example.

In the drawing:

FIG. 1 is a longitudinal sectional view of a device illustrating one embodiment of the present invention.

FIG. 2 is a sectional view taken along the line 2—2 on FIG. 1.

FIG. 3 is a sectional view taken along the line 3—3 on FIG. 1.

FIG. 4 is a sectional view taken along the line 4—4 on FIG. 1.

FIG. 5 is a fragmentary sectional view of a device illustrating another manner of using a device in accordance with the present invention.

Referring to FIGS. 1 to 4 of the drawing in detail, there is shown a device which generally comprises an inner tube 10 adapted for connection to a source of vacuum at its upper end, a larger diameter co-axial outer tube 11, means for holding the tubes in spaced relation to provide a passageway 12 therebetween, and an assembly 13 for closing the passageway at its upper end and providing means for delivery of atmospheric air to the passageway.

The inner tube 10 is provided with means at its upper end (not shown) for coupling a hose thereto which is connected to a source of vacuum, and is cut-off at an angle at its lower end to provide a point 14 which protrudes beyond the outer tube to facilitate insertion of the device into a mass of fluent particles of material and to prevent closure of the end of the passageway against the bottom of a receptacle.

The means for holding the tubes in concentrically spaced relaion may be one or more sets of radial extending set screws 15 (FIGS. 1 and 2) spaced circumferentially apart 120°, for example, and threaded into the outer tube to engage the inner tube. If desired, a bar 16 is secured to the lower end of the outer tube and the outer surface of the point 14 of the inner tube to provide for further support between the tubes and to prevent relative longitudinal movement of the tubes.

The outer tube 11 is somewhat shorter than the inner tube and is formed with one or more openings 17 at its upper end, four being shown spaced circumferentially 90° apart, for admitting atmospheric air to the passageway 12 (FIGS. 1 and 3).

An important feature of the present invention is to fluidize particles of the material which have been compacted in the lower portion of the inner tube when the vacuum is shut off and particles drop back through the inner tube. This is accomplished by providing the inner tube with one or more apertures 18, six being shown arranged spirally 90° apart. These apertures entrain air from the passageway 12 when the vacuum is turned on again which flows through the material and loosens the compacted particles. This effect, together with air entrained at the lower end of the passageway and drawn upwardly through the inner tube, assures dispersal of the compacted mass.

In a practical embodiment of the present invention, it has been found that excellent results can be attained by utilizing an inner tube 10 which has a cross-sectional area about equal to the cross-sectional area of the passageway 12 and with the combined areas of the four openings 17 being almost equal to the cross-sectional area of the passageway and the inner tube and with combined areas of the six apertures 18 being about equal to the area of one of the openings 17.

The assembly 13 comprises a cap 19 fitting over the upper end of the outer tube 11 formed with an opening 20 in the top for providing a close fit for the inner tube 10, a plurality of radial apertures 21 adapted for registry with the openings 17 and a circumferentially extending slot 22, and a screw 24 extending through the slot and threaded into the outer tube 11 (FIG. 4) for limiting the rotative movement of the cap 19. Preferably, the screw 24 has a head 25 for engaging the outer wall of the cap to secure the same in its desired position of adjustment.

By turning the cap 19 the extent of registry between the openings 17 and the apertures 21 can be varied to control the effective area of the openings 17 and the flow rate of atmospheric air to the passageway 12.

In operation, the lower end of the device is inserted into a mass of fluent particles of material and vacuum is applied to the upper end of the inner tube whereupon the material is drawn upwardly in the inner tube. This causes a partial vacuum to be applied at the lower end of the passageway 12 whereby air in the passageway is entrained and air is drawn down the passageway. This flow of air is effective to fluidize the material adjacent the lower end of the device to facilitate drawing the material upwardly through the inner tube. The degree of the fluidizing effect can be controlled by means of the cap 19.

In FIGS. 1 to 4, the device is illustrated as an assembly adapted to be inserted into a receptacle containing the material. In FIG. 5, however, a device is illustrated which is connected to the bottom of a hopper 26 by means of an adaptor 27 which comprises a tube 28 formed with an angularly disposed closed end 29 and an inclined tubular section 30 connected to a side opening therein for receiving the lower end of the device and provided with a wiry nut 31 for securing the outer tube of the device within the tubular section. As shown, the closed end 29 and the tubular section 30 are inclined in opposite directions and the side opening faces the closed end, with the longitudinal axes of the tube 28 and the tubular section 30 being substantially perpendicular with respect to each other.

From the foreging description, it will be seen that the present invention provides a simple, practical and economical device for promoting the conveying of fluent particles of material.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A device for withdrawing fluent particles of material capable of compacting which device comprises an inner tube having an opening at its upper end adapted for connection to a source of vacuum and having an opening at its lower end, said inner tube having a longitudinally spaced apart aperture means extending therethrough, an outer tube coextensive with said inner tube and spaced from said inner tube to provide a passageway between said tubes, said passageway being open at the lower ends of said tubes, said outer tube having an opening means adjacent its upper end passing therethrough and communicating with the atmosphere, and means for closing said passageway at its upper end, the lower portion of said device being adapted to be inserted into a mass of the material whereby air in said passageway is drawn through said aperture means and material in said inner tube at its lower end to fluidize the particles of material within said inner tube.

2. A device according to claim 1, wherein the combined area of said aperture means is much less than the cross-sectional area of said inner tube.

3. A device according to claim 1, wherein said aperture means solely constitute a plurality of spirally arranged apertures about ninety degrees apart.

4. A device according to claim 1, wherein the lower end of said inner tube extends outwardly beyond the lower end of said outer tube and is pointed to facilitate insertion of the device into the mass of material.

5. A device according to claim 1, wherein means are provided for regulating the effective area of said opening means.

References Cited in the file of this patent

UNITED STATES PATENTS

| | | |
|---|---|---|
| 337,388 | Fernald | Mar. 9, 1886 |
| 528,418 | Duckham | Oct. 30, 1894 |
| 530,829 | Duckham | Dec. 11, 1894 |
| 661,609 | Hoover | Nov. 13, 1900 |
| 1,150,317 | Timmons | Aug. 17, 1915 |
| 1,640,583 | Steinruck | Aug. 30, 1927 |

FOREIGN PATENTS

| | | |
|---|---|---|
| 4,814 | Great Britain | Mar. 29, 1915 |